March 30, 1948.    S. M. CRUMRINE    2,438,656
TRACTION DEVICE
Filed Aug. 29, 1946
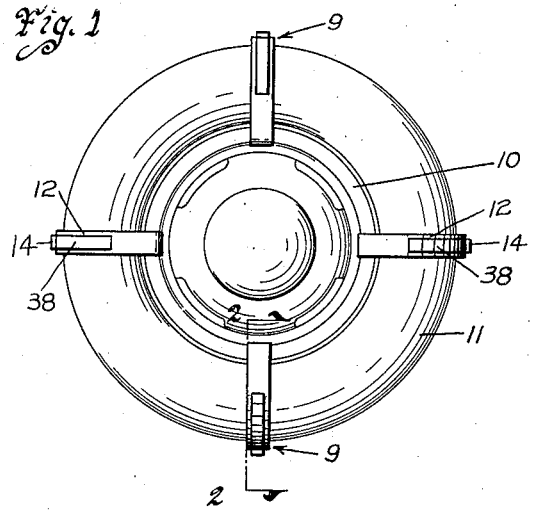
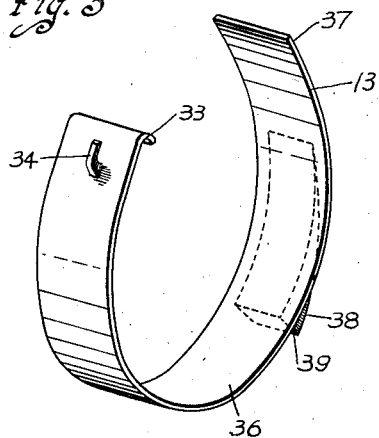
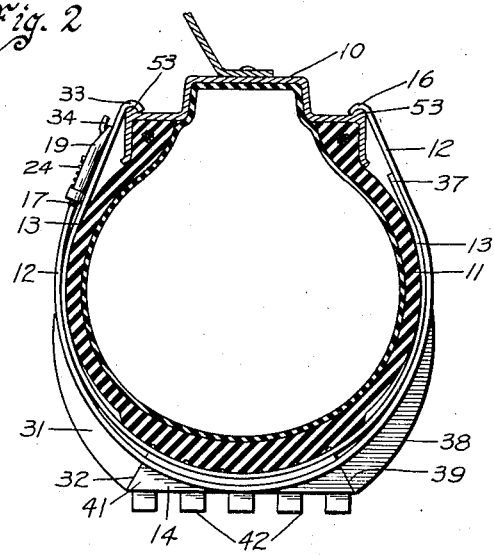
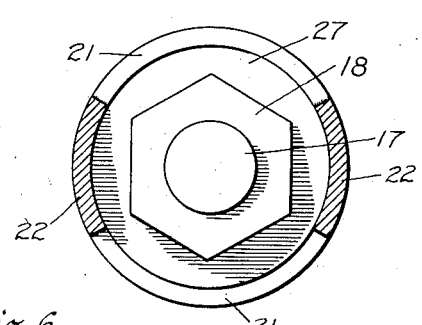
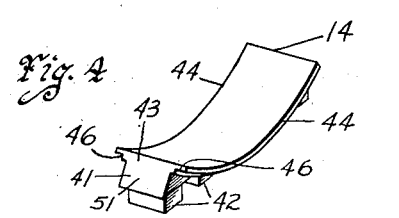
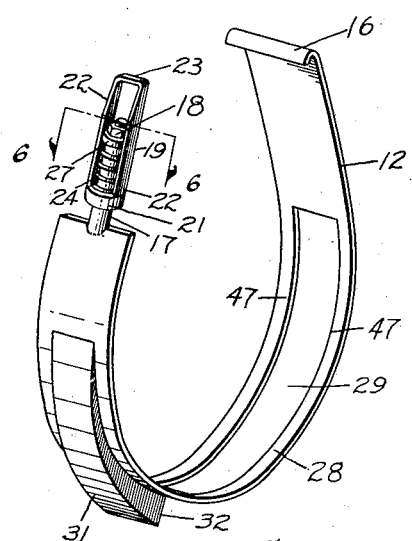
INVENTOR.
S. M. Crumrine
BY Rudolph L. Lowell
Attorney Patented Mar. 30, 1948

2,438,656

UNITED STATES PATENT OFFICE 2,438,656

TRACTION DEVICE

Sol M. Crumrine, Des Moines, Iowa

Application August 29, 1946, Serial No. 693,726

5 Claims. (Cl. 152—226)

This invention relates generally to traction devices and in particular to a detachable traction device for the tire of an automobile wheel.

Traction and non-skid devices now in common use for automobiles generally include, or are entirely comprised of, chains which are subject to wear and resultant breakage. A usual tire chain has short chain lengths adapted to extend about a tire at relatively spaced positions and engageable with the road surface for traction purposes. These short chain lengths, when the tire chain is in use, often times break and catch a part of the automobile fender so as to badly tear or damage the fender, or act as beaters to dent the fender before the automobile is brought to a stop. Further, the broken chain lengths are difficult to replace on the road at the time they are needed.

A further objection to the usual tire chains is found in the fact that they are difficult to secure and maintain in a tight position on the tires so that the traction portions of the chains are constantly moving relative to the tire. Also the chains are generally ineffective to prevent either a forward or a sidewise skidding movement of the automobile.

It is an object of this invention, therefore, to provide an improved traction device for an automobile tire.

A further object of this invention is to provide a traction device for an automobile tire in which a traction member on becoming worn or broken, retains its assembly position on the tire so as to eliminate any damage to the automobile body.

Another object of this invention is to provide a traction device for a tire in which a ground engaging member is adapted to be replaced with a minimum of time and effort.

A still further object of this invention is to provide a traction device for an automobile tire in which ground engaging members are of a construction capable of reducing both a forward and sidewise skidding movement of an automobile.

Another object of this invention is to provide a traction device for an automobile tire, which is adapted to automatically adjust itself in a snug encircling position about the tire in response to a flexing movement of the tire.

Still a further object of this invention is to provide a traction device for an automobile tire which is of a rugged construction, capable of withstanding hard usage over prolonged periods of time without requiring any servicing attention, readily and quickly attachable to a usual automobile wheel, and comprised of a few parts adapted to be economically manufactured.

A feature of this invention is found in the provision of a traction device for an automobile tire in which a pair of substantially U-shaped members, assembled in relatively nested positions and adapted to extend about a wheel tire, have opposite ends thereof connectible with opposite sides of the wheel rim. A pair of adjacent ends of the U-members are yieldably connected together whereby the members are slidably movable relative to each other to snugly fit about the tire. A traction member, movably carried on the U-members for movement radially of the tire, has portions adapted to coact with portions on the U-members to relatively move the U-members to more closely encircle the tire when the traction member is in a ground engaging position.

Further objects, features and advantages of this invention will become apparent from the following description when taken in connection with the accompanying drawings in which:

Fig. 1 is a side elevational view of an automobile wheel showing traction devices of this invention in assembly relation therewith;

Fig. 2 is an enlarged sectional view, as seen on the line 2—2 in Fig. 1;

Figs. 3, 4 and 5 are perspective detail views of the parts forming the traction device of this invention; and Fig. 6 is an enlarged sectional view taken on the line 6—6 in Fig. 5.

With reference to the drawings, a traction device of this invention, designated generally as 9, is illustrated in Fig. 1 in assembly relation with a usual automobile wheel having a rim 10 and a tire 11. The traction device 9 (Fig. 2) includes a pair of substantially U-shaped members 12 and 13 and a traction or ground engaging unit 14.

The U-member 12 (Fig. 5) is composed of a flat spring material and integrally formed at one end with an inwardly extended hook 16. The opposite end of the U-member 12 carries a pin or rod member 17 which is threaded at its free end to receive a nut 18. Slidably supported on the rod 17 for axial movement, is a connecting member or link 19 having a bottom or base member 21 of an annular shape provided with a central opening adapted to loosely receive the rod 17. A pair of oppositely arranged upright guides 22, on the base member 21 are of an arcuate shape in cross section for a purpose which will appear later. The upper ends of the guides 22 are connected by a brace member 23. A coil spring 24 is mounted about the rod 17 between the top side of the base member 21, and a second washer 27 engageable with the under side of the nut 18.

The washer 27 (Figs. 5 and 6) is adapted to be guidably received between the upright guides 22 of the connecting link 19 to guide the link 19 in conjunction with the extension of the rod 17 through the link base member 21 for slidable movement in a direction axially of the rod 17. In other words, the connecting link 19 constitutes a slidable extension for the rod 17, with its movement in one direction outwardly from the end of the rod being against the action of the spring 24.

The intermediate section 28 of the U-member 12 is formed with a longitudinally extended slot 29 (Fig. 2). Provided on the convex side of the U-member 12, between the slot 29 and the rod 17, is a longitudinally extended projection 31 which has its outer side or surface tapered inwardly from the slot 29 toward the rod 17. The inner end 32 of the projection 31 (Figs. 2 and 5) lies in a plane extended substantially radially of the U-member 12.

The U-member 13 is composed of a flat spring material, similar to the material forming the U-member 12, and terminates at one end in an inwardly extended hook 33 (Fig. 3). An upwardly extended hook 34 is projected outwardly from the concave side of the U-member 13 at a position spaced downwardly from the hook 33. Arranged between the central section 36 and the end 37 of the U-member 13, and projected outwardly from the concave side of the member 13 is a longitudinally extended projection 38 constructed similarly to the projection 31 on the U-member 12 and having its inner end 39 arranged in a plane substantially on a radius of the U-member 13.

The traction member 14 (Figs. 2 and 4) is of an integral metal construction and includes a body member 41 having downwardly projected ground engaging members 42 arranged in a longitudinally spaced relation on its lower side. The ground engaging members 42 are of a substantially rectangular shape, and have their bottom surfaces arranged in a common plane. It is seen, therefore, that the edges defining the bottom surface of a ground engaging member 42 are straight and relatively sharp for a purpose which will appear later.

The top or head 43 of the body member 41 has side portions 44 extended laterally outwardly from the opposite sides of the body member. The top side of the head member 43 is of a concave shape longitudinally of the body member 41 and has a curvature corresponding substantially to the curvature of the central sections 28 and 36 of the U-members 12 and 13, respectively.

In the assembly of the traction device of this invention the body member 41, of the ground engaging unit 14, is positioned within the U-member 12 and extended outwardly therefrom through the slot 29 to a position defined by the engagement of the sides 44 of the head member 43 with the inner or convex side of the central section 28 of the U-member 12. The sides 44 of the head member 43 are undercut, as indicated at 46 in Fig. 4, to engage the side walls 47 of the slot 29. This engagement of the undercut portions 46 with the slot side walls 47 maintains the traction unit 14 against movement transversely of the U-member 12, while providing for movement of the traction member longitudinally of the slot 29.

With the U-member 12 and the traction member 14 thus relatively assembled, the U-member 13 is nested within the U-member 12 with the concave side of the central section 36 positioned within the concave upper side of the traction unit 14 and with the projection 38 arranged within and extended outwardly from the slot 29 at a position oppositely arranged from the projection 31 on the U-member 12 (Fig. 2). In this assembly relation of the U-members 12 and 13 and of the traction unit 14, the inner ends 32 and 39 of the projections 31 and 38, respectively, are in bearing engagement with the opposite ends 51 of the body member 41 of the traction unit 14, which ends 51 are tapered inwardly and upwardly from the ground engaging members 42 so as to be in continuous bearing engagement with the projections 31 and 38.

The assembly relation of the traction device is maintained by hooking the brace member 23 of the connecting link 19 over the hook 34 of the U-member 13. The spring pressed link 19 and the hook 34 thus constitute a yieldable connection between the corresponding adjacent ends of the U-members 12 and 13 to provide for a relative slidable longitudinal movement between the two U-members for a purpose which will be later explained.

In use the traction device is positioned about the tire 11 which is received within and against the inner or convex side of the U-member 13, it being understood that the traction unit 14 is maintained in assembly relation within the traction device by the clamping or holding action of the U-members 12 and 13 on the sides 44 of the head member 43. With the tire positioned within the traction device, the hooks 16 and 33 are positioned over the opposite side edges 53 of the wheel rim 11. This connection of the hooks 16 and 33 with the wheel rim 11 is readily accomplished by virtue of the yieldable extension of the traction device, as provided by the yieldable connection of the link 19 with the hook 34. Further, since the spring 24 acts to continuously urge the link 19 toward the lower end of the rod 17, as viewed in Fig. 2, the hooks 16 and 33 are continuously biased against the rim edges 53 to maintain the hooks in connection with the rim and the traction device in a snug fit about the tire 11.

Stated otherwise, the action of the spring 24 to slidably move the link 19 in a direction downwardly on the rod 17, effects a downward pulling action on the hook 16, as viewed in Fig. 2, by virtue of the upward pressure applied by the spring on the nut 22 and the connection of the brace 23 with the hook 34. Concurrently with this action of the spring 24 a downward pressure is applied on the hook 33 by virtue of the connection of the link 19 with the hook 34 on the U-member 13. As a result a downward pull is exerted on both of the hooks 16 and 33.

In a usual operation of the tire 11 it is well known that the tire is flexed radially of the wheel at that portion thereof which is in engagement with the road surface. Likewise, it is also well known that the application of an increased weight or traction on the tire 11 will in turn increase its flexing movement at the road engaging portion thereof. By virtue of the yieldable connection of one pair of adjacent ends of the U-members 12 and 13 through the spring pressed link 19, the traction device is automatically adjusted to snugly encircle the tire 11 regardless of its flexing movement. In this connection, the relative assembly of the traction unit 14 with the U-members 12 and 13 supplements the action of the yieldable connection of the U- members to maintain the traction device about the tire 11.

Thus in the normal operation of the vehicle, when the traction unit 14 engages the road surface, the tire 11 is flexed inwardly radially of the wheel so that the traction unit 14 is moved in a like direction. Because of the bearing engagement of the ends 51 of the traction unit 14 with the inner ends of the projections 31 and 38, the projections 31 and 38 are moved away from each other. The outward movement of the projection 38 results in a downward pull on the hook 33 while the outward movement of the projection 31 results in a downward pull on the hook 16. As a result the traction device undergoes a contracting movement to more snugly engage the tire 11. This same action of the traction unit 14 on the U-members 12 and 13 takes place when an additional weight or tractive force is applied on the tire 11.

As was previously mentioned, the edges defining the bottom surfaces of the ground engaging members 42 are straight and relatively sharp. Any tendency, therefore, of the vehicle wheels to skid in either a forward or a sidewise direction is retarded by the digging action of these sharp edges into the road surface, which digging action is particularly effective due to the continuous action of the traction device to snugly encircle the tire 11. By virtue of this action of the traction device, the traction unit 14 is maintained in a substantially fixed position on the tire and against any rolling or tilting movement which would reduce the effectiveness of the cutting edges on the ground engaging members 42.

Since the traction unit 14 is detachably connected with the U-members 12 and 13, and with the U-members 12 and 13 alone acting to maintain the traction device in its assembled position on the tire 11, it is readily apparent that the ground engaging members 42 may be worn completely flat to the bottom side of the body member 41 of the traction unit without in any way effecting the assembly of the traction device on the tire. Also, should the traction unit 14 be worn so as to be ineffective for traction purposes, it may be readily replaced, while the vehicle is on the road, by simply detaching the hooks 16 and 33 from the wheel rim 10 and assemblying a new traction unit with the U-members 12 and 13.

From a consideration of the above description it is seen that the invention provides an improved traction device for a vehicle wheel which is of a compact and simple construction, automatically adjustable to maintain a snug assembly position on the wheel tire regardless of the flexing movement of the tire, and readily and quickly assembled with and removed from the tire. The traction unit 14 constitutes the sole replacement in the traction device and is provided with portions 51 adapted to coact with portions 32 and 39 on the U-members 12 and 13, respectively, to continuously maintain a snug fit of the device about the tire.

Further, a complete wearing out of the ground engaging members 42 in no way endangers damage to the automobile body or a loosening of the device on the vehicle wheel. Also the ground engaging members are of a construction such as to effectively reduce any skidding movement of the vehicle wheel.

Although the invention has been described with respect to a preferred embodiment thereof, it is to be understood that it is not to be so limited since changes and modifications can be made therein, which are within the full intended scope of this invention as defined by the appended claims.

I claim:

1. A traction device for a vehicle wheel having a rim and a tire comprising, a first member of a substantially U-shape adapted to be positioned about the tire and having a pair of hooks extended laterally outwardly in opposite directions at one end thereof, a second member of a substantially U-shape adapted to fit about the first U-member in a mating relation, and having a hook at one end for engaging one side of said wheel rim, with one of the hooks on said first U-member being adapted to engage the opposite side of the wheel rim, yieldable means at the opposite end of said second member adapted for connection with the second one of said hooks on said first U-member, a traction unit movably supported on said two members intermediate the ends thereof, and coacting portions on said two members and on said traction unit adapted to cooperate with said yieldable means to maintain a pulling force on the hook ends of said two U-members in response to a movement of said traction member radially inwardly of said wheel.

2. A traction device for a vehicle wheel having a rim and a tire comprising, a pair of nested substantially U-shaped members adapted to extend about said tire, means at opposite ends of said U-members adapted to be connected with opposite sides of said wheel rim to hold said two members about the tire, means yieldably connecting said pair of U-members for relative longitudinal movement, and a traction unit supported on said pair of U-members intermediate the ends thereof.

3. A traction device for a vehicle wheel having a rim with a tire thereon comprising, a pair of nested substantially U-shaped members adapted to extend about the tire, means connecting opposite ends of said U-members with opposite sides of said rim, means yieldably connecting a pair of adjacent ends of said U-members such that one of said U-members is yieldably movable longitudinally relative to the other U-member, a traction unit movably supported on said two members, at a position opposite a ground engaging portion of the tire, for movement radially of the vehicle wheel, and coacting means on said traction unit and on said two U-members to move said one U-member relative to the other U-member in response to a flexing movement of said tire resulting from the engagement of said traction unit with the road surface.

4. A traction device for a vehicle wheel having a rim and a tire comprising, a pair of substantially U-shaped members, with a first one of said U-members being adapted for nesting engagement within the second one of said U-members, and with said two U-members being adapted to extend about said tire, means at one end of said second U-member for engaging one side of said rim, means at one end of said first U-member for engaging the opposite side of said rim, means for yieldably connecting said one end of the first U-member with the other end of said second U-member to provide for a relative longitudinal movement between said two U-members, a traction member movably carried on said two U-members intermediate the ends thereof, and coacting means on said traction member and on said two U-members for relatively moving said two U-members in response to a radial flexing movement of said tire resulting from the engagement of said traction member with the road surface.

5. A traction device for a vehicle wheel having a tire and a rim comprising, a pair of substantially U-shaped members arranged in a nested relation one within the other and adapted to receive said tire, means for connecting opposite ends of said pair of U-members with opposite sides of said rim, means yieldably connecting together one of the adjacent ends of said two U-members to provide for a relative longitudinal movement between said two members, a traction member having a ground engaging portion and a laterally extended head portion, with the other of said U-members having a longitudinally extended slot adapted to receive said ground engaging portion therethrough, so that said head portion is positioned between said two U-members, with the end surfaces of said traction member being inclined upwardly and inwardly from said ground engaging portion, and a pair of oppositely arranged projections on said two U-members having tapered surfaces adapted for bearing engagement with the end surfaces of said traction member, said traction member on contact with the road surface, being movable toward the tire so that the end surfaces thereof are moved against said projections whereby said U-members are relatively moved to more closely encircle said tire.

S. M. CRUMRINE.

REFERENCES CITED

The following references are of record in the file of this patent:

UNITED STATES PATENTS

| Number | Name | Date |
|---|---|---|
| 1,224,103 | Carter | Apr. 24, 1917 |
| 1,486,716 | Wood | Mar. 11, 1924 |